2 Claims. (Cl. 259—8)

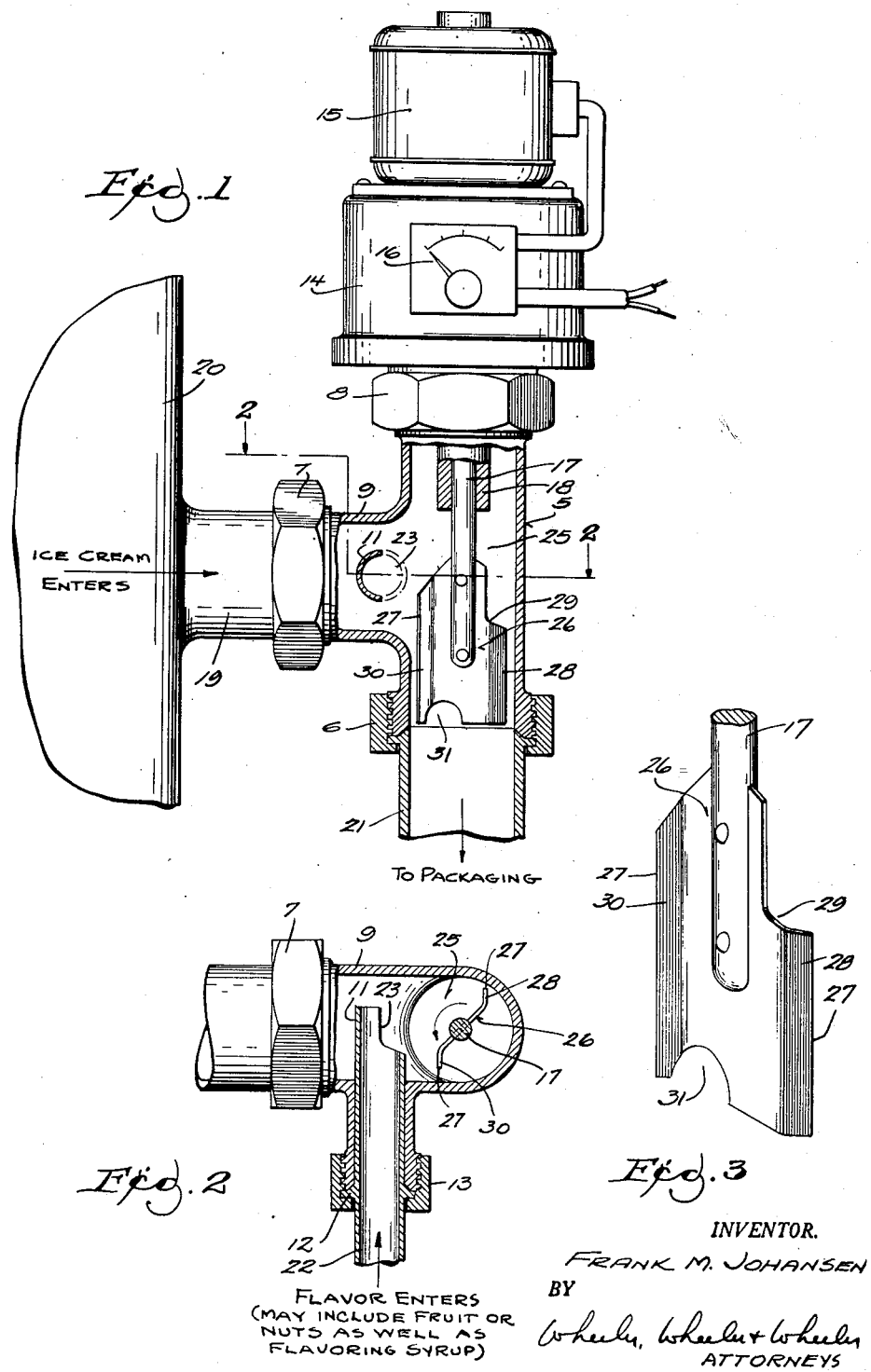

This invention relates to the introduction of bands or discrete bodies of flavoring material (including fruit and nuts) into ice cream.

It is contemplated that whole small fruits or chunks of fruit, or nuts may be introduced instead of, or in addition to, flavoring syrups in plastic rather than liquid form, whereby the flavoring will not be diffused but will retain its identity in the mass of plastic ("soft frozen") ice cream enroute from the freezer to the point of packaging.

The invention contemplates the provision of a generally conventional T-fitting of the type used in sanitary equipment near the outlet of the freezer from which the plastic ice cream issues under pressure enroute to packaging. In the preferred arrangement, the ice cream enters the fitting at the side and leaves at the bottom. At the top there is mounted a speed reducer having a driving motor and a driven shaft which extends into the fitting and is there provided with a slowly rotating paddle of special design. The paddle is preferably disposed just below the center of the lateral inlet. The inlet is tapped to receive a pipe through which the flavoring particles or plastic mix is introduced under pressure such as may be supplied through any sanitary pump which will avoid comminuting or homogenizing the discrete particles of fruits or nuts which may be included at the option of the manufacturer. The pipe projects into the path of admission of the ice cream and is desirably cut away at the delivery side.

The mixing paddle is motor operated at a speed which has been found in practice to be satisfactory at about 200 to 225 r.p.m. Desirably this paddle is not flat but has its side margins curved forwardly in the direction of rotation, these being slightly spaced from the walls of the fitting and largely or entirely disposed below the center line of the lateral inlet. Neither is the paddle symmetrical. One side is marginally relieved at the top of the paddle, while the other side has an upwardly extending notch at the bottom of the paddle between the center line of the drive shaft and the side margin. While these pecularities are not essential to the operation of the device, it has been found that a more desirable distribution of the flavoring material in the ice cream results from this construction.

In the drawings:

FIG. 1 is a view of a device embodying the invention as it appears partially in side elevation and partially in vertical axial section.

FIG. 2 is a view taken in section on the line 2—2 of FIG. 1.

FIG. 3 is an enlarged detail view in perspective of the rotary mixing element, the drive shaft being shown in section.

The T-fitting 5 is of sanitary design, having its ends provided with square threaded and easily removable ring nuts 6, 7 and 8 to facilitate removal of the fitting for cleaning. In addition, the lateral inlet portion 9 of the fitting is provided with an auxiliary inlet portion 10 in which there is an inlet tube 11 provided with a gland 12 and its own detachable ring nut 13.

Connected to the fitting by means of the ring nut 8 is a gear reducer 14 with a driving motor 15 desirably controlled, as to speed, by a rheostat 16. The gear reducer has an output or drive shaft 17 suitably journaled in an elongated bearing at 18 and projecting downwardly through the fitting 5. The fitting 5 has its lateral inlet 9 detachably connected by the nut 7 with any suitable source of plastic ice cream under pressure, the output duct 19 of a freezer 20 being diagrammatically illustrated to exemplify such a source.

The lower end of the T-fitting 5 is connected by means of the ring nut 6 with a spout or pipe 21 leading to any desired packaging station or device. Packaging is sometimes done by hand and sometimes by machine and it is immaterial to the present invention how it is done.

The flavoring material which it is desired to introduce in the form of bands or discrete bodies or chunks enters from any suitable pressure source through the pipe 22 and the sleeve 11, the latter being anchored by its gland 12 and nut 13 in the collar 10 which opens into the lateral inlet 9 from the freezer. The sleeve 11 extends about half way across the inlet 9, and its delivery end is desirably cut away at 23 in the direction of ice cream flow. The pipe 22 and sleeve 11 preferably have sufficient cross section to receive small fruits or chunks of fruit, and nuts or chunks of nutmeat as discrete bodies. These may enter in a syrup or independently of a syrup, or fudge or other flavoring material in plastic condition may enter without any mixture of fruit or nuts. In any event, the flavoring material is supplied under pressure through pipe 22 and is entrained in the stream of plastic ice cream which is divided in the lateral inlet portion 9 of the T-fitting 5 by passing about the margin of the sleeve 11.

As the ice cream and entrained flavoring material enters the chamber 25 in fitting 5, it is acted upon by the two bladed paddle 26 carried on the shaft 17. The blades have been found best to serve the purposes of the present invention when they are not symmetrical. Both blades may be curved forwardly in the direction of rotation at their leading margins 27. The blade 28 is desirably relieved at its upper margin 29 to pass a large nut or fruit while the blade 30 is relieved by notch 31 in its lower margin. The blades tend to distribute the syrup helically in the ice cream, the thickness or amount being subject to regulation by varying the rate of rotation.

The particular combination described, and especially the notched or relieved margins at 29 and 31 have proved to be more satisfactory than a symmetrical rotor as a means of erratically but generally uniformly distributing discrete particles of the flavoring ingredients whether solid such as nutmeats or fruits, or fragments thereof, or plastic such as semi-solid syrups. Solids may be carried in a syrup vehicle to facilitate flow under pressure.

While it is not desired to limit the invention to any particular rate of rotation, it may be noted that with a two inch fitting through which ice cream is forced at the rate of 500 gallons per hour, it has been found perfectly satisfactory to use a motor 15 turning at 1550 r.p.m. to drive the shaft 17 and mixer 26 at a speed of about 220 r.p.m. through a speed reducer having a 7 to 1 reduction. However, by means such as the rheostat 16, the operator can adjust the speed of paddle rotation to whatever speed produces the best results.

The relieved portions of the paddles tend to leave discrete bodies of flavoring materials but to distribute these rather uniformly throughout the ice cream enroute to the packaging point. The paddle 30 has no notch at its upper margin and hence tends to sweep about the ice cream mix whatever particles of flavoring material it encounters. On the other hand, the notch 29 in the upper margin of paddle 28 will tend to avoid immediate contact with the portion of the flavoring mterial which is entering when this particular paddle passes the lateral inlet.

Similarly, the notch 31 varies the point of discharge of the flavoring material from the paddle 30 as compared with the point of discharge of such material from the paddle 28.

It will be observed that the pipe 22 through which the flavor enters is sufficiently large and unobstructed so that it will handle fruit and nutmeats as well as syrups. This is very advantageous, as compared with conventional commercial devices which include nozzles of various sorts which obstruct the discharge of solid particles and limit the application to syrups.

The particular form and location of the flavor introducing duct 22 is also important. It is not only disposed immediately adjacent the mixing paddle means, and therefore close to the axis of the delivery pipe 21, but it is at the precise point where the ice cream in plastic form is entering laterally toward such axis, the stream of ice cream being divided by the wall 11 to receive the flavoring material which is passed through the notch 23 in the end of pipe 22.

The advantage of the particular mixing means construction has already been described. It takes what would otherwise be a continuous central core of flavoring material and, instead of merely twisting it into a helix, it breaks up the flavoring material into discrete bodies which are distributed about the mass of ice cream in a somewhat random pattern which nevertheless assures that no large area of the ice cream will be without bodies of the flavoring material or materials.

I claim:

1. A device for introducing discrete bodies of flavoring material throughout plastic ice cream, said device comprising a distributing chamber having a distributor mounted for rotation therein, power means for rotating the distributor, said chamber having an outlet substantially aligned with the axis of distributor rotation, a lateral ice cream inlet to admit a stream of ice cream into the chamber on a path lateral to the axis of distributor rotation, a lateral flavoring material inlet to admit flavoring material into the chamber on a path lateral to the axis of distributor rotation, said distributor having axially elongated blade means extending transversely substantially completely across said chamber and including an axially elongated edge movable laterally across the paths of movement of the ice cream and the flavoring material for intercepting the flavoring material and segregating it into discrete bodies and distributing said bodies in the stream of ice cream without diffusing the flavoring material in the ice cream, said blade means comprising a pair of axially elongated oppositely directed blades having side margins projecting forwardly in the direction of blade rotation, the respective blades having portions of their opposite upper and lower margins relieved.

2. The device of claim 1 in which the relief of the opposite margins of the respective blades includes a substantially complete elimination of the upper lateral marginal portion of one of said blades, the other blade having its lower end margin provided with an upwardly extending notch.

References Cited by the Examiner

UNITED STATES PATENTS

| 3,254 | 9/43 | Johnson | 259—134 |
| 1,215,214 | 2/17 | Stewart | 259—134 |
| 1,281,610 | 10/18 | Lundahl | 259—134 |
| 1,772,083 | 8/30 | Hollenback | 259—88 |
| 2,290,122 | 7/42 | Wiggins | 138—37 |
| 2,669,945 | 2/54 | Wildebour | 107—1.4 |
| 2,736,534 | 2/56 | Atkins | 259—8 |
| 2,788,337 | 4/57 | Preiswerk et al. | 259—8 X |

WALTER A. SCHEEL, *Primary Examiner.*

H. BERMAN, H. L. MARTIN, J. S. SHANK, LEO QUACKENBUSH, *Examiners.*